(12) United States Patent
Popov

(10) Patent No.: US 9,887,595 B2
(45) Date of Patent: Feb. 6, 2018

(54) ELECTRICAL MACHINE WITH INNER STATOR

(71) Applicant: ALMOTT, Ltd., Stara Zagora (BG)

(72) Inventor: Encho Nikolov Popov, Sofia (BG)

(73) Assignee: ALMOTT LTD., Stara Zagora (BG)

( * ) Notice: Subject to any disclaimer, the term of this patent is extended or adjusted under 35 U.S.C. 154(b) by 251 days.

(21) Appl. No.: 14/892,069

(22) PCT Filed: Feb. 19, 2014

(86) PCT No.: PCT/BG2014/000008
§ 371 (c)(1),
(2) Date: Nov. 18, 2015

(87) PCT Pub. No.: WO2014/205523
PCT Pub. Date: Dec. 31, 2014

(65) Prior Publication Data
US 2016/0118849 A1    Apr. 28, 2016

(30) Foreign Application Priority Data

Jun. 26, 2013    (BG) .................................. 111518

(51) Int. Cl.
*H02K 1/12*    (2006.01)
*H02K 1/14*    (2006.01)
(Continued)

(52) U.S. Cl.
CPC ............. *H02K 1/148* (2013.01); *H02K 1/187* (2013.01); *H02K 3/18* (2013.01); *H02K 7/14* (2013.01);
(Continued)

(58) Field of Classification Search
CPC .......... H02K 5/04; H02K 5/165; H02K 3/487; H02K 3/345; H02K 3/34; H02K 21/222
(Continued)

(56) References Cited

U.S. PATENT DOCUMENTS

2002/0149287 A1* 10/2002 Rose, Sr. ................. B60K 6/26
                                                                310/254.1
2006/0016628 A1    1/2006 Heinen
(Continued)

FOREIGN PATENT DOCUMENTS

DE    102010033852 A1    2/2012
EP        1895640 A2    3/2008
GB        2459061 A    10/2009

OTHER PUBLICATIONS

International Search Report for PCT/BG2014/000008 dated Feb. 18, 2015.

*Primary Examiner* — Thanh Lam
(74) *Attorney, Agent, or Firm* — Brown & Michaels, PC

(57) ABSTRACT

It is designed for traction motors in motor-in-wheels, fans, and direct driving electric machines. The inner stator (1) consists of pole elements (13) comprising external periphery (14), core (15), part of yoke (16), externally wound bobbin (3). The pole elements (13) on inner aluminum housing (4) are stationary fit. In housing (4) on bearings in end bells outer rotor (8) carrying motor-in-wheel (6) or another operating mechanism is sustained. The inner housing (4) is a carrier of the electrical machine and the operating mechanism, laterally closing side plate-carrier of electronic control device.

8 Claims, 3 Drawing Sheets

(51) Int. Cl.
*H02K 1/18* (2006.01)
*H02K 3/18* (2006.01)
*H02K 7/14* (2006.01)
*H02K 9/19* (2006.01)
*B60K 7/00* (2006.01)
*H02K 3/32* (2006.01)
*H02K 5/20* (2006.01)
*H02K 11/33* (2016.01)

(52) U.S. Cl.
CPC .... *B60K 7/0007* (2013.01); *B60K 2007/0092* (2013.01); *H02K 3/325* (2013.01); *H02K 5/20* (2013.01); *H02K 9/19* (2013.01); *H02K 11/33* (2016.01)

(58) Field of Classification Search
USPC ............... 310/67 R, 89, 214–215, 254.1, 74
See application file for complete search history.

(56) References Cited

U.S. PATENT DOCUMENTS

| | | | |
|---|---|---|---|
| 2007/0222322 A1* | 9/2007 | Yokota | H02K 3/522 310/214 |
| 2013/0140926 A1* | 6/2013 | Bailey | H02K 1/187 310/71 |
| 2013/0233026 A1* | 9/2013 | Yoon | D06F 37/304 68/12.16 |
| 2013/0300249 A1* | 11/2013 | Omura | H02K 1/14 310/216.092 |
| 2013/0342067 A1* | 12/2013 | Jang | H02K 1/2786 310/156.38 |
| 2013/0342071 A1* | 12/2013 | Shim | H02K 3/527 310/220 |

* cited by examiner

ELECTRICAL MACHINE WITH INNER STATOR

FIELD OF THE INVENTION

The present invention relates to electrical machine with inner stator and with permanent magnet excitation in outer rotor, designed mainly for direct drive of motor-in-wheels with built-in motors mostly for electric vehicles and more especially for traction motors in motor-in-wheels, fans, direct driving electric machines.

DESCRIPTION OF PRIOR ART

Electrical machine with inner stator is known [1] including inner stator with plurality of slots on its outside surface wherein three-phase winding is laid with number of slots per pole and phase q<1. The inner stator is stationary fit on to inner aluminum housing supporting through bearings an outside wheel with a tyre assembled thereon and installed on the inside rotor of electrical machine with permanent magnets. Canals for circulating cooling liquid are formed in the inner aluminum housing. Electronic control device in disc-shape is mounted to one side of the inner aluminum housing. Cooling ribs are formed on the lateral external surface of the inner aluminum housing. Between rotating wheel and the immovable inner housing is assembled a dynamic seal between friction-resistant surfaces. Disadvantage of the known electrical machine with inner stator is that the weight of stator pack is several times less than the quantity of used electric grade sheet for its making.

Other disadvantage is the increased electric resistance due to lower winding space factor of the slots with copper wire and the increased length of coils end connections due to wire laying in the slots through their narrower opening.

Disadvantage is also the worse heat abstraction from wires to stator pack and the increased temperature owing to decreased contact surface at the lower winding space factor of the wires towards the slot walls.

As a result of the disadvantages the electric grade sheet quantity necessary for stator pack making is essentially increased and electrical machine power is decreased.

SUMMARY OF THE INVENTION

The aim of the invention is to create electrical machine with inner stator with decreased electric grade sheet quantity necessary for stator pack making and with increased electrical machine power.

The aim is solved by electrical machine with inner stator including inner stator with plurality of slots on its outside surface where three-phase winding is laid with number of slots per pole and phase q<1. The inner stator is stationary fixed on to inner aluminum housing supporting through bearings a wheel with assembled tire thereon and mounted on the inside rotor of electrical machine with permanent magnets. In the inner aluminum housing are formed canals for circulating cooling liquid. To one side of the inner aluminum housing electronic control device in disc-shape is mounted. On the lateral external surface of the inner aluminum housing cooling ribs are formed. Between rotating wheel and the immovable inner housing a dynamic seal between friction-resistant surfaces is assembled. According to the invention the inner stator consists of arranged on the inner aluminum housing stator elements in the shape of salient poles. Each stator element comprises upper peripheral part, core and externally wound bobbin belonging to three-phase winding and adjoining part of stator yoke. Bobbins are isolated from inner stator by isolation. In wedge-shaped spaces between said bobbins wedges are pushed, between said stator elements and said inner aluminum housing immovable joint by sticking and through peripheries of said inner stator by rivets is secured.

Advantage of the invention is several times reducing the consumption of used electric grade sheet for stator making as well as the increased power due to the decreased electrical losses in the bobbins and the improved heat abstraction from bobbins to poles because of shortened length of bobbins end connections and reduced quantity of copper wire as well as reduced electric resistance due to the outside well-arranged winding of pole bobbins.

Additional advantage is the simplicity of the tool and sheets punching process forming the salient poles.

DETAILED DESCRIPTION OF THE PREFERRED EMBODIMENTS

Figure 1:
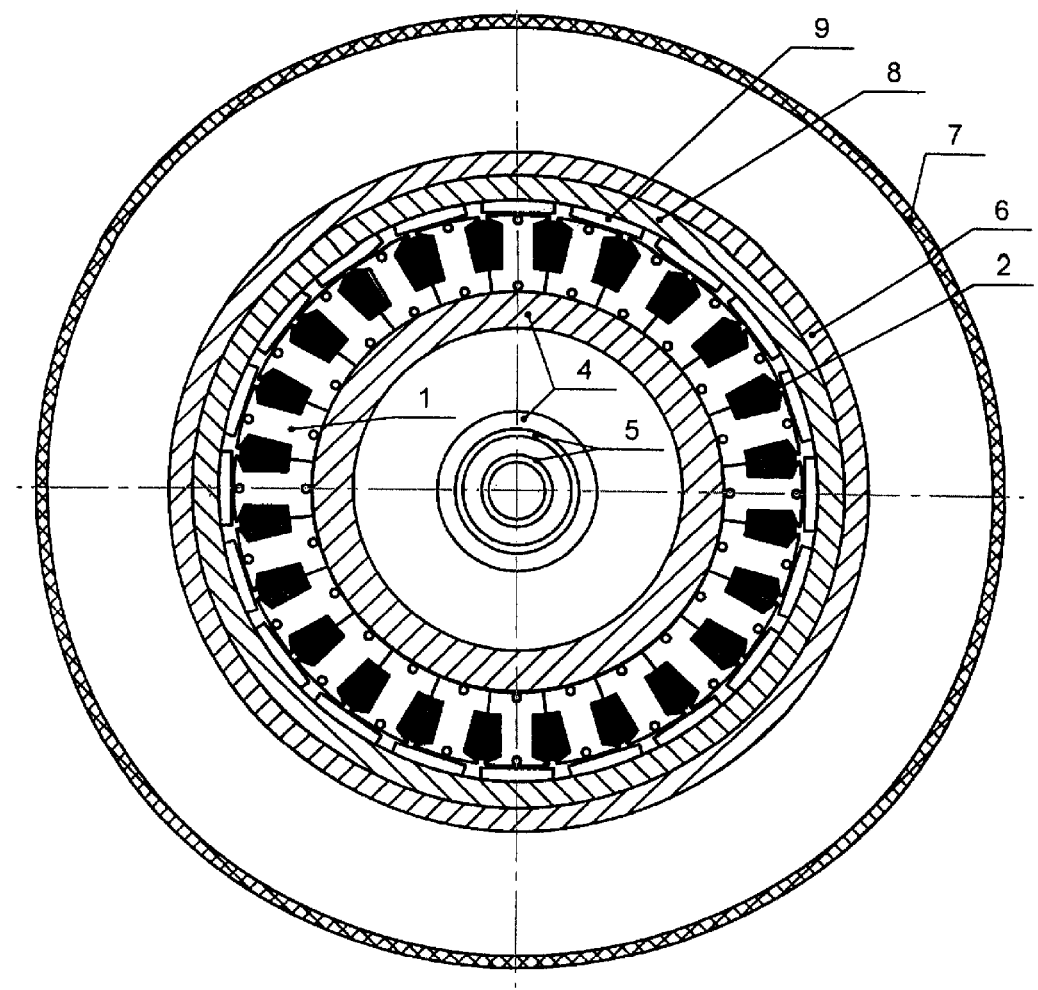
FIG. 1 represents cross section of motor-in-wheel with inner stator.
Figure 2:
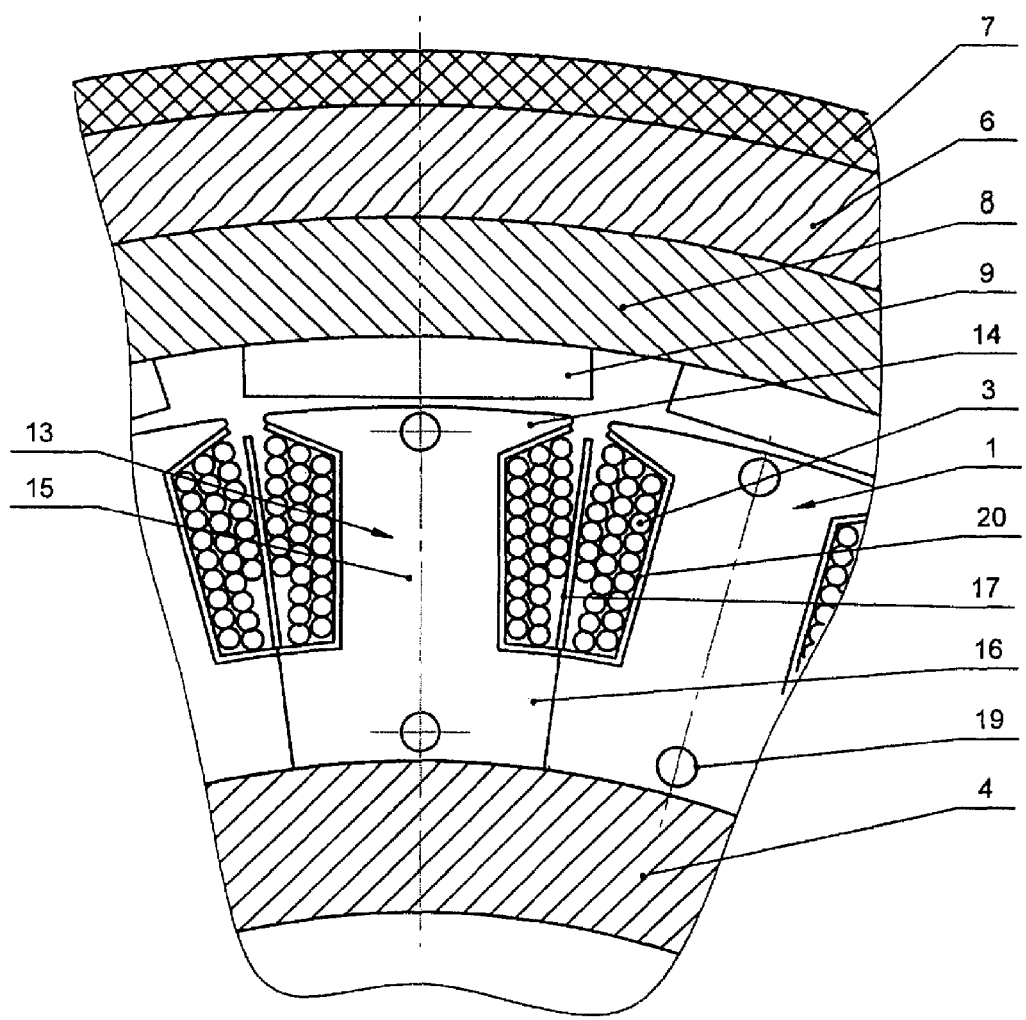
FIG. 2 represents cross section through the inner stator.
Figure 3:
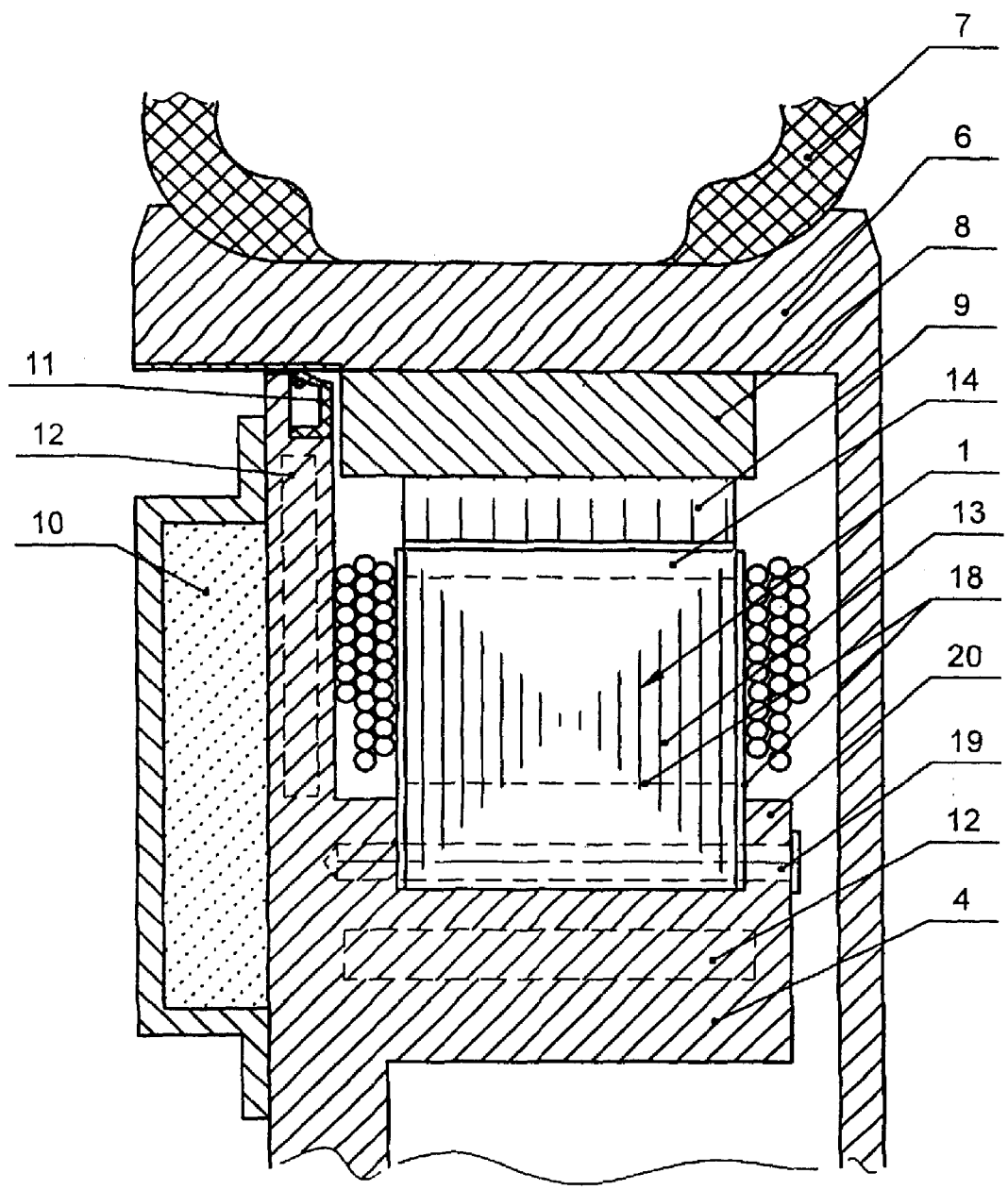
FIG. 3 represents longitudinal section through the inner stator.

In an example embodiment the electrical machine with inner stator comprises inner stator 1 [FIG. 1] with plurality of slots 2 on its outside surface. In the slots 2 bobbins 3 of three-phase winding are laid. The stator 1 is stationary fit on to round outside surface of inner aluminum housing 4. In the inner aluminum housing 4 motor-in-wheel 6 enveloped by tire 7 is supported through bearings 5. The wheel 6 envelops external rotor 8 with permanent magnets 9 stationary fit on the inner rotor side. To one side of the inner aluminum housing 4 is pressed electronic control block 10 in disc-shape. Dynamic seal 11 is assembled between the immovable part comprising the stator 1 and the wheel 6. Internal canals 12 for circulating cooling liquid are formed in the inner aluminum housing 4, shown on FIG. 3.

The inner stator 1 consists of arranged on the inner aluminum housing 4 stator elements 13 in the shape of salient poles with externally wound bobbins 3. Each stator element 13 comprises upper peripheral part 14, core 15, externally wound bobbin 3 and adjoining part 16 of stator yoke. Bobbins 3 of the three-phase winding are isolated from the stator elements 13 through isolations 18. Wedges 17 are pushed in formed wedge-shaped spaces between the bobbins 3. The immovable joint between stator elements 13 and inner aluminum housing 4 is secured by sticking of stator elements 13 to inner aluminum housing 4 and also by driven rivets 19 holding back stator elements 13 to peripheries 20 of inner aluminum housing 4.

Operation of Electrical Machine with Inner Stator

After power supply through electronic control 10 to bobbins 3 of the three-phase windings in the motor with inner stator 1 the outer rotor 8 with permanent magnets 9 starts turning along with the wheel 6. Evolved electrical and added losses in bobbin 3 are reduced on account of reduced electric resistance due to reduced length of turns. The iron losses in cores 15 of pole elements 13 are also reduced due to reduced radial dimensions owing to smaller height of bobbins 3 which is due to increased winding space factor of the space between cores 15 of pole elements 13. As a result the power of the electrical machine with inner stator is increased.

Experimental Results Received by Sample Investigation Realising the Invention

The inventor has made experimental sample of electric motor with inner stator in motor-in-wheel for small city electric car. By keeping the parts of existing motor-in-wheel only the existing inner stator 1 is replaced by stator made according to the invention. In the inner stator 1 according to the invention the slot 2 depth is reduced from 23 to 15 mm in comparison with the existing stator. Turns number and total section of copper wires in the slots 2 are reserved while winding space factor of the slots with copper wires is increased from about 40% to 60%. Inductive drop in stator winding is reduced and in operating state the voltage of the electrical machine is increased by 9%. The winding electric resistance is reduced by 8%. At equal driving torque loadings the winding temperature in the electrical machine according to the invention is reduced by approximately 20%. The consumption of electric grade sheet is reduced by 70%. Through reduced electrical losses and iron losses and improved cost the power is increased by approximately 20%.

REFERENCE

[1] Making the Impossible, Possible-Overcoming the Design Challenges of In Wheel Motors, Dr. Dragica Kostic Perovic-Protean Electric Ltd, Unit 10B Coxbridge Business Park, Alton Road, Farnham, Surrew GU10 SHE, UK, Dragica, kostic-petrovic@proteanelectric.com

The invention claimed is:

1. An electrical machine with inner stator comprising:
a) an inner non-magnetic housing having a periphery;
b) an inner stator comprising:
  i) a plurality of prefabricated stator elements arranged radially around the non-magnetic housing, each prefabricated stator element comprising:
    A) an inner end attached to the non-magnetic housing, each inner end being in contact with the inner ends of adjacent prefabricated stator elements to form a yoke;
    B) a core radially outward from the inner end; the core of each prefabricated stator element having a rectangular cross section with a reduced circumferential dimension such that slots are formed between the cores of adjacent prefabricated stator elements;
    C) an upper peripheral part radially outward from the core, the upper peripheral part of each stator element forming a cylindrical surface having a circumferential dimension such that there is a gap between the upper peripheral parts of adjacent stator elements;
    D) a coil of wire wound on the core, the wire of the coil being disposed in the slots between adjacent stator elements, the coil being isolated from the stator element by insulation;
  iii) the coils of wire on the plurality of stator elements being connected together to form a winding;
  iv) a plurality of wedges of electro and magneto non-conductive material located between the coils of wire on adjacent stator elements; and
c) an external rotor surrounding the inner stator, having a plurality of permanent magnets on an inner surface opposite the stator elements of the inner stator.

2. The electrical machine of claim 1, further comprising a wheel enveloping and fastened to the external rotor, the wheel being supported upon the inner aluminum housing by bearings.

3. The electrical machine of claim 2, further comprising a tire assembled on the wheel.

4. The electrical machine of claim 2, further comprising a dynamic seal between the wheel and the inner aluminum housing.

5. The electrical machine of claim 1, further comprising a disc-shaped electronic control device mounted to a side of the inner aluminum housing.

6. The electrical machine of claim 1, further comprising a plurality of canals for circulating cooling liquid formed inside the inner aluminum housing.

7. The electrical machine of claim 1, in which the yoke of the inner stator is mounted to the inner housing by gluing.

8. The electrical machine of claim 1, in which the wire of each coil of wire is arranged in a plurality of rows arranged along a length of the core, each of the rows having a plurality of turns of wire, and at least one of the plurality of rows closest to the outer peripheral part has a reduced number of turns relative to rows closer to the inner end.

\* \* \* \* \*